(12) United States Patent
Russell et al.

(10) Patent No.: US 9,148,522 B2
(45) Date of Patent: Sep. 29, 2015

(54) METHODS, SYSTEMS, AND COMPUTER READABLE MEDIA FOR DETERMINING POLICY INFORMATION ASSOCIATED WITH AN EMERGENCY CALL

(71) Applicant: Oracle International Corporation, Redwood Shores, CA (US)

(72) Inventors: Travis Earl Russell, Clayton, NC (US); Ajay Padmakar Deo, Carrollton, TX (US); Robert James Sparks, Plano, TX (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 14/039,512

(22) Filed: Sep. 27, 2013

(65) Prior Publication Data
US 2015/0092610 A1 Apr. 2, 2015

(51) Int. Cl.
*H04L 12/16* (2006.01)
*H04M 15/00* (2006.01)
*H04M 3/51* (2006.01)

(52) U.S. Cl.
CPC ............ *H04M 15/66* (2013.01); *H04M 3/5116* (2013.01); *H04M 15/61* (2013.01)

(58) Field of Classification Search
CPC ...................................................... H04M 15/66

USPC ......... 370/261–270, 328–339, 390; 455/426, 455/518–519
See application file for complete search history.

(56) References Cited

U.S. PATENT DOCUMENTS

2007/0149166 A1* 6/2007 Turcotte et al. ............ 455/404.1
2013/0017827 A1* 1/2013 Muhanna et al. .......... 455/426.1

OTHER PUBLICATIONS

NENA Detailed Functional and Interface Standards for the NENA i3 Solution (TSD), NENA 08-003 v1, Jun. 14, 2011.*
"Detailed Functional and Interface Specification for the NENA i3 Solution—Stage 3," NENA the 9-1-1 Association, NENA 08-003 Version 1, pp. 1-282 (Jun. 14, 2011).

* cited by examiner

*Primary Examiner* — Iqbal Zaidi
(74) *Attorney, Agent, or Firm* — Jenkins, Wilson, Taylor & Hunt, P.A.

(57) ABSTRACT

Methods, systems, and computer readable media for determining policy information associated with an emergency call are disclosed. According to one method, the method occurs at a policy and charging rules function (PCRF) separate from an emergency services routing proxy (ESRP). The method includes receiving, from the ESRP, a request for one or more policy rules regarding an emergency call, wherein the request includes an intended destination of the emergency call and determining, using the intended destination, one or more policy rules.

25 Claims, 4 Drawing Sheets

METHODS, SYSTEMS, AND COMPUTER READABLE MEDIA FOR DETERMINING POLICY INFORMATION ASSOCIATED WITH AN EMERGENCY CALL

TECHNICAL FIELD

The subject matter described herein relates to determining policy information. More specifically, the subject matter relates to methods, systems, and computer readable media for determining policy information associated with an emergency call.

BACKGROUND 911 systems in the United States allow for a known telephone number to be used for requesting emergency services. Generally, there are two ways to reach a 911 call center or public-safety answer point (PSAP); fixed line and wireless. For example, trunks to the PSAP can be provided through either a fixed line or wireless carrier.

In some 911 systems, a selective router may receive emergency calls (e.g., calls to 911) along with automatic number identification that identifies the class of service and the calling party billing telephone number. The selective router may route the call and the call data to the appropriate PSAP (based on location).

Wireless 911 systems generally support location data with an accuracy of within 300 meters. For example, calls to 911 from mobile phones may include approximate location information, e.g., provided by a mobile network or a node therein. Similarly, voice over Internet protocol (VoIP) calls to 911 may not provide location data of the actual terminal calling, so a static address may be provisioned to provide an approximate location. In this example, the static address may be stored in a global address database maintained by a telephone network operator or service provider.

Recently, a group of next generation 911 (NG911) standards has been developed. These NG911 standards are defined in the document entitled, "NENA Detailed Functional and Interface Standards for the NENA i3 Solution (TSD)", NENA 08-003 v1, Jun. 14, 2011; the disclosure of which is incorporated herein in its entirety. These NG911 standards move the 911 architecture to an Internet protocol (IP) infrastructure and provide a NG911 call center as a nationwide service, e.g., rather than a local service. By defining a nationwide service using an IP infrastructure, these NG911 standards provide various opportunities to service providers and network operators. However, some issues still remain, including various security concerns.

Accordingly, in light of these difficulties, a need exists for improved methods, systems, and computer readable media for determining policy information associated with an emergency call.

SUMMARY

Methods, systems, and computer readable media for determining policy information associated with an emergency call are disclosed. According to one method, the method occurs at a policy and charging rules function (PCRF) node separate from an emergency services routing proxy (ESRP): The method includes receiving, from the ESRP, a request for one or more policy rules regarding an emergency call, wherein the request includes an intended destination of the emergency call and determining, using the intended destination, one or more policy rules.

According to one system, the system includes at a policy and charging rules function (PCRF) node separate from an emergency services routing proxy (ESRP): The PCRF node includes at least one processor and memory. The PCRF node is configured to receive, from the ESRP, a request for one or more policy rules regarding an emergency call, wherein the request includes an intended destination of the emergency call and to determine, using the intended destination, one or more policy rules.

The subject matter described herein may be implemented in software in combination with hardware and/or firmware. For example, the subject matter described herein may be implemented in software executed by a processor. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory devices, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

As used herein, the term "node" refers to a physical computing platform including one or more processors and memory.

As used herein, the terms "function" or "module" refer to hardware, firmware, or software in combination with hardware and/or firmware for implementing features described herein.

BRIEF DESCRIPTION OF THE DRAWINGS

The subject matter described herein will now be explained with reference to the accompanying drawings of which.

DETAILED DESCRIPTION

The subject matter described herein discloses methods, systems, and computer readable media for determining policy information associated with an emergency call. For example, some next generation 911 (NG911) systems may use an IP-based architecture. Such NG911 systems may also use session initiation protocol (SIP) as a routing protocol for related emergency calls and/or other media. In some NG911 systems, an emergency call routing function (ECRF) in a service provider network may be used (instead of a selective router) to send emergency calls to one or more emergency services routing proxies (ESRPs). Such ESRPs may route or facilitate routing emergency calls through an emergency services network, such as an emergency services internet (ESInet) or i3 network. For example, a first ESRP may route emergency calls and related call data to a second ESRP and the second ESRP may route emergency calls to one or more public-safety answering points (PSAPs) within an ESInet. Conventionally, policy is part of an ESRP's functionality.

In accordance with some aspects of the subject matter described herein, a policy and charging rules function (PCRF) may be a distinct and/or separate entity from an ESRP. The PCRF may perform determine and/or provide policy information (e.g., policy and charging control (PCC) rules) to one or more nodes. For example, a PCRF may interface with multiple ESRPs and may provide policy information to the ESRPs.

In accordance with some aspects of the subject matter described herein, a PCRF may utilize an intended destination associated with an emergency call in determining policy information. For example, a PCRF may receive a policy request indicating that an emergency call is intended for a particular network. In the example, the PCRF may access state information associated with the particular network and may use this information in determining how and/or whether an emergency call should be routed, such as by providing rules instructing that the emergency call be routed away from a congested network or node.

Advantageously, by making policy decisions based on an intended call destination, policies may be enforced for preventing telephony denial of service (TDOS) at a public-safety answer point (PSAP). For example, call treatments may be based on a call destination and may use state information associated with the call destination, e.g., as provided by one or more ESRPs or other network nodes, such as an SBC or an analytics engine associated with a NG911 system).

In accordance with some aspects of the subject matter described herein, an ESRP may be configured to request policy information from a PCRF (e.g., when an emergency call or call request is identified as suspicious) and may use the policy information for preventing telephony denial of service (TDoS), directing calls to appropriate destinations, altering call priorities, and/or other actions. For example, PCRF may determine and provide policy information to an ESRP, where the ESRP is configured to enforce the policy information.

Advantageously, by separating policy functionality from ESRPs, network operators may improve scalability of policy rules, provisioning efficiency, call setup time, and/or resource utilization. Further, call degradation caused by excessive processing delays may be significantly reduced if an PCRF interfaces with a final ESRP in an ESRP chain rather than with every ESRP in a call route, thereby, providing routing information and call treatments at one node or location rather than every hop.

Reference will now be made in detail to exemplary embodiments of the subject matter described herein, examples of which are illustrated in the accompanying drawings. Wherever possible, the same reference numbers will be used throughout the drawings to refer to the same or like parts.

Figure 1:
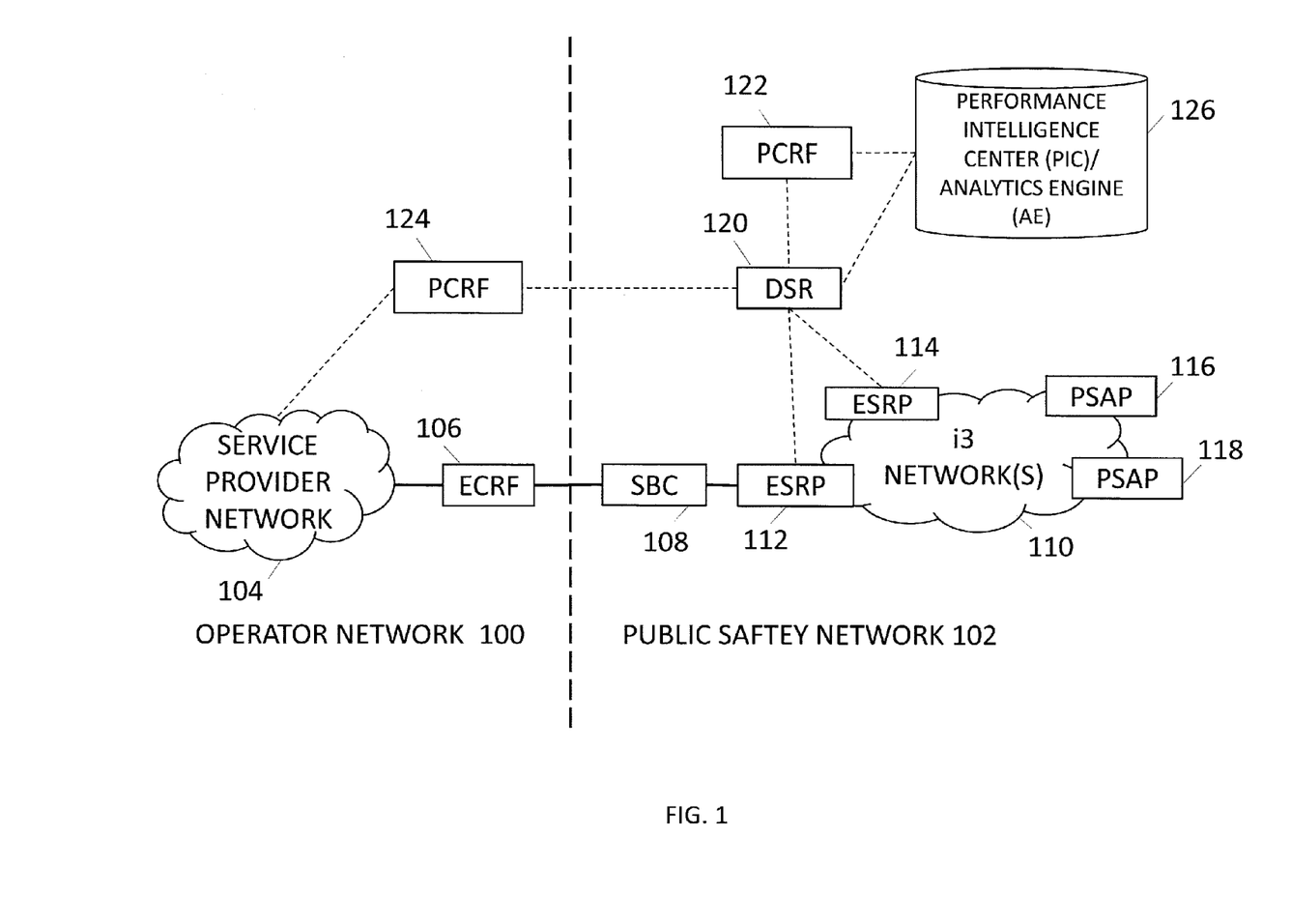
FIG. 1 is a diagram illustrating an exemplary operator network and an exemplary public safety network according to an embodiment of the subject matter described herein.

FIG. 1 is a diagram illustrating an exemplary operator network 100 and an exemplary public safety network 102 according to an embodiment of the subject matter described herein. Operator network 100 may represent any suitable network for communicating media associated with one or more subscribers. Operator network 100 may include a service provider network 104.

Service provider network 104 may include various nodes for communicating media (e.g., voice and/or data) between subscribers, networks, and/or nodes. In some embodiments, service provider network 104 may be a network associated with a particular service area and/or service type. For example, service provider network 104 may be a mobile (e.g., a 3G or 4G) network, a signaling system number 7 (SS7) network, a public switched telephone network (PSTN), or an Internet protocol (IP) network.

In some embodiments, service provider network 104 may be a radio access network (RAN) or other access network. For example, service provider network 104 may be a global system for mobile communications (GSM) RAN (GRAN), a general packet radio service (GPRS) access network, a universal mobile telecommunications system (UMTS) RAN (UTRAN), an evolved UTRAN (eUTRAN), an Internet protocol (IP) connectivity access network (IPCAN), a code division multiple access (CDMA) network, an evolution-data optimized (EV-DO) network, a wideband CDMA (WCDMA) network, a high speed packet access (HPSA) network, an evolved HPSA (EHPSA+) network, or a long term evolution (LTE) access network. Service provider network 104 may include one or more transceivers (e.g., base stations or evolved Node Bs) for communicating with user equipment (UE) associated with subscribers. Exemplary UEs may include a computer, a pager, a mobile phone, a smartphone, a wireless modem, or other devices through which a subscriber accesses network services.

Service provider network 104 and/or operator network 100 may include nodes for communicating with public safety network 102. Service provider network 104 and/or operator network 100 may include or associate with a PCRF 124 and an ECRF 106. PCRF 124 may include any suitable entity (e.g., a node or computing platform comprising at least one processor and memory) for performing one or more policy related functions. PCRF 124 may be a centralized node that can act as a policy decision point for operator network 100. PCRF 124 may communicate with nodes using various protocols and/or interfaces. For example, PCRF 124 may communicate via a Diameter interface, a lightweight directory access protocol (LDAP) interface, a SOAP interface, an extensible markup language (XML) interface, or other interface. PCRF 124 may take operator defined service policies, subscription information pertaining to a user, and other data into account to build policy decisions. Policy decisions may be formulated as PCC rules. PCC rules may contain information about user plane traffic expressed as a packet filter. For example, a packet filter may take the form of an IP five-tuple specifying: (1) source IP address(es), (2) destination IP address(es), (3) source port number(s), (4) destination port number(s), and (5) application protocol(s) (e.g., transmission control protocol (TCP), user datagram protocol (UDP)). All IP packets matching a packet filter of a PCC rule may be designated a session data flow.

ECRF 106 may include any suitable entity for facilitating communications with public safety network 102 or nodes therein. ECRF 106 may provide routing information to one or more entities or nodes. For example, ECRF 106 may be provided by a 9-1-1 Authority and may be accessible by nodes in operator network 100 or service provider network 104. In another example, ECRF 106 may be accessible by nodes in public safety network 102 or an i3 network 110. ECRF 106 may determine an appropriate route to an appropriate i3 network 110 (e.g., an ESInet network) for handling an emergency call.

In some embodiments, ECRF 106 may route emergency calls and related information to one or more nodes in public safety network 102. For example, ECRF 106 may be provisioned with routing information (e.g., uniform resource identifiers (URIs)) from a network operator or a management node so as to route emergency calls to a particular ESRP 112. In another example, ECRF 106 may be provisioned with routing information from a network operator or a management node so as to route emergency calls to a node in public safety network 102.

Public safety network 102 may represent any suitable network for providing access to NG911 services. In some embodiments, public safety network 102 may include a nationwide network including multiple i3 (e.g., ESInet) networks. Public safety network 102 may be an IP based network. For example, public safety network 102 may use SIP for setting up and tearing down emergency calls and a Diameter protocol for performing policy related functions.

Public safety network 102 may include SBC 108, a Diameter signaling router (DSR) 120, a PCRF 122, a performance intelligence center and/or an analytics engine (PIC/AE) 126, and/or one or more i3 networks 110. SBC 108 may be any suitable entity for performing a border control function (BCF). SBC 108 may facilitate communications between nodes in operator network 100 and public safety network 102. SBC 108 may perform or utilize network address translation (NAT) and/or firewall functionality. SBC 108 may perform one or more inspection and/or security functions. For example, SBC 108 may use deep packet inspection (DPI), header inspection, or other techniques in determining whether a received call request or related call is suspicious. In this example, if a received call request or related call is determined to be suspicious, one or more nodes (e.g., PCRF 122) may be informed and an appropriate action may be determined for handling the received call request or related call.

In some embodiments, SBC 108 may be a stand-alone node, e.g., a BCF node. In some embodiments, SBC 108 may be co-located or integrated with one or more nodes, e.g., ESRP 112 or ESRP 114.

DSR 120 may be any suitable entity for routing or relaying Diameter signaling messages (e.g., Credit-Control-Request (CCR) and Credit-Control-Answer (CCA) messages) routing between Diameter nodes. For example, DSR 120 may be an LTE signaling router, an LTE Diameter signaling router, a Diameter signaling agent, a Diameter proxy, a Diameter routing agent, or a Diameter redirect agent. DSR 120 may include functionality for processing various messages and may use routing information (e.g., obtained from a local or remote database) for providing messages to various nodes in operator network 100 and/or public safety network 102.

PCRF 122 may include any suitable entity (e.g., a node or computing platform comprising at least one processor and memory) for performing one or more policy related functions. PCRF 122 may be a centralized node that can act as a policy decision point for public safety network 102. PCRF 122 may take operator defined service policies, subscription information pertaining to a user, network conditions, an intended destination or destination network associated with a call or session, an originator, and other data into account to build policy decisions. Policy decisions may be formulated as PCC rules. PCRF 122 may communicate with nodes using various protocols and/or interfaces. For example, PCRF 122 may communicate via a Diameter interface, an LDAP interface, a SOAP interface, an XML interface, or other interface.

In some embodiments, PCRF 122 may be a stand-alone node, e.g., a policy server or a MPE. In some embodiments, PCRF 122 may be co-located or integrated with one or more nodes, e.g., DSR 120 or PIC/AE 126.

In some embodiments, PCRF 122 may be able to define or generate policy rules using a destination of a call or session. For example, PCRF 122 may be able to define a set of rules for each destination associated with an emergency call request.

In contrast, a conventional ESRP is integrated with a policy control function (PCF) which performs policy determinations based on an originator (e.g., a mobile subscriber integrated services digital network (ISDN) Number (MSISDN) or other subscriber identifier).

In some embodiments, PCRF 122 may determine policy information (e.g., a call treatment) based on a destination associated with a call or session and the state of the destination (e.g., whether the destination is congested or currently experiencing problems). In some embodiments, policy determinations may include altering a priority associated with a call based on whether the call is marked or identified as suspicious. For example, using policy information from PCRF 122, ESRP 116 may provide high priority (e.g., non-suspicious) calls different treatments (e.g., better routes to a less congested PSAP 116) than lower priority traffic (e.g., suspicious calls). In some embodiments, policy information may include a URI associated with a new destination for an emergency call.

In some embodiments, PCRF 122 may receive state information about a destination from nodes in i3 network (such as SBC 108 or ESRP 112) and/or from querying PIC/AE 126. For example, ESRP 112 may send state information about a related network using Diameter messages. In another example, PCRF 122 may request state information about a particular network a monitoring system, such as PIC/AE 126.

PIC/AE 126 may communicate with nodes in public safety network 102 and/or nodes in operator network 100. PIC/AE 126 may monitor inbound traffic to and outbound traffic from safety public network 102. For example, PIC/AE 126 may receive and maintain real-time status of all inbound and outbound traffic facilities, such as PSAP administration lines. PIC/AE 126 may use collected information in performing event analytics and/or incident reporting.

i3 network(s) 110 may represent one or more networks (e.g., ESinet networks) for providing emergency services. In some embodiments, each i3 network 110 may be associated with a particular geographical area and may use different protocols or variants thereof. For example, each i3 network 110 may be associated with a certain city, state, or regions therein. In this example, each i3 network 110 may include various nodes for handling emergency calls.

I3 network(s) 110 may include ESRP 112, ESRP 114, PSAP 116, and/or PSAP 118. Each of ESRP 112 or ESRP 114 may be any suitable entity (e.g., software executing on a processor of a computing platform) for routing calls towards a destination (e.g., PSAP 116 or PSAP 118). Each of ESRP 112 or ESRP 114 may collect data about i3 network(s) 110 and/or related nodes (PSAP 116 and PSAP 118). Each of ESRP 112 or ESRP 114 may be capable of communicating with PCRF 122 (e.g., via DSR 120 or without using DSR 120). For example, ESRP 112 may request policy information from PCRF 122, e.g., if a suspicious emergency call request is received and/or if an intended destination is congested or experiencing problems. Each of ESRP 112 or ESRP 114 may be configured to receive a SIP message and may modify, using policy information and/or routing information, the SIP message prior to routing the SIP message onward.

In some embodiments, ESRP 112 and/or ESRP 114 may represent a particular type of ESRP. For example, ESRP 112 or ESRP 114 may be an originating ESRP, an intermediate ESRP, or a terminating ESRP. An originating ESRP may receive a call from SBC 108 or a BCF function. An intermediate ESRP may receive calls from an originating ESRP and may route the call onward to either another intermediate ESRP or a terminating ESRP. A terminating ESRP may be a last ESRP in a series of one or more ESRPs and may route a call to a call taker (e.g., PSAP 116 or PSAP 118) or set of call takers.

In some embodiments, policy determination may be performed solely by a terminating ESRP, e.g., instead of policy determination being performed by every ESRP handling an emergency call request. For example, if ESRP 112 represents a terminating ESRP, multiple ESRPs may handle an emergency call request prior to reaching ESRP 112. In this example, prior to reaching terminating ESRP 112, other ESRPs may route an emergency call request onward without requesting policy rules from PCRF 122. In this example, the other ESRPs may use predefined (e.g., preinstalled) policy rules and/or default routing information in determining where and/or whether to route an emergency call request.

In some embodiments, policy determination may be performed solely by an originating ESRP. For example, if ESRP 112 represents an originating ESRP and receives a suspicious emergency call request from SBC 108, ESRP 112 may query PCRF 122 for one or more policy rules. In this example, depending on the policy rules received from PCRF 122, ESRP 112 may continue routing the emergency call request to a call taker (e.g., PSAP 116), send the emergency call request to an investigative entity (e.g., PSAP 118), decrease a priority associated with the emergency call request, report the emergency call request, or discard the emergency call request.

Each of PSAP 116 or PSAP 118 may be any suitable entity (e.g., a computing platform or multiple computing platforms) for receiving or answering emergency calls. For example, PSAP 116 or PSAP 118 may include a call center for answering calls to an emergency telephone number (e.g., 9-1-1) associated with providing police, firefighting, emergency medical services (EMS), and/or other emergency services. Each of PSAP 116 or PSAP 118 may report data about i3 network(s) 110 and/or related nodes to ESRP 112, ESRP 114, and/or other nodes. Each of PSAP 116 or PSAP 118 may be configured to receive emergency calls and related data via one or more protocols, such as SIP, signaling system 7 (SS7), and/or other protocols. For example, PSAP 116 or PSAP 118 may receive a SIP Invite message and may respond with a SIP 200 OK message. In another example, a PSAP gateway node may allow PSAP 116 to communicate with legacy networks and/or nodes.

It will be appreciated that FIG. 1 is for illustrative purposes and that various nodes, their locations, and/or their functions described above in relation to FIG. 1 may be changed, altered, added, or removed. For example, some nodes and/or functions may be combined into a single entity, e.g., SBC 108 and ESRP 112 may be included in a single node. In a second example, a node and/or function may be located at or implemented by two or more nodes, e.g., PIC/AE 126 may be distributed across multiple nodes.

Figure 2:
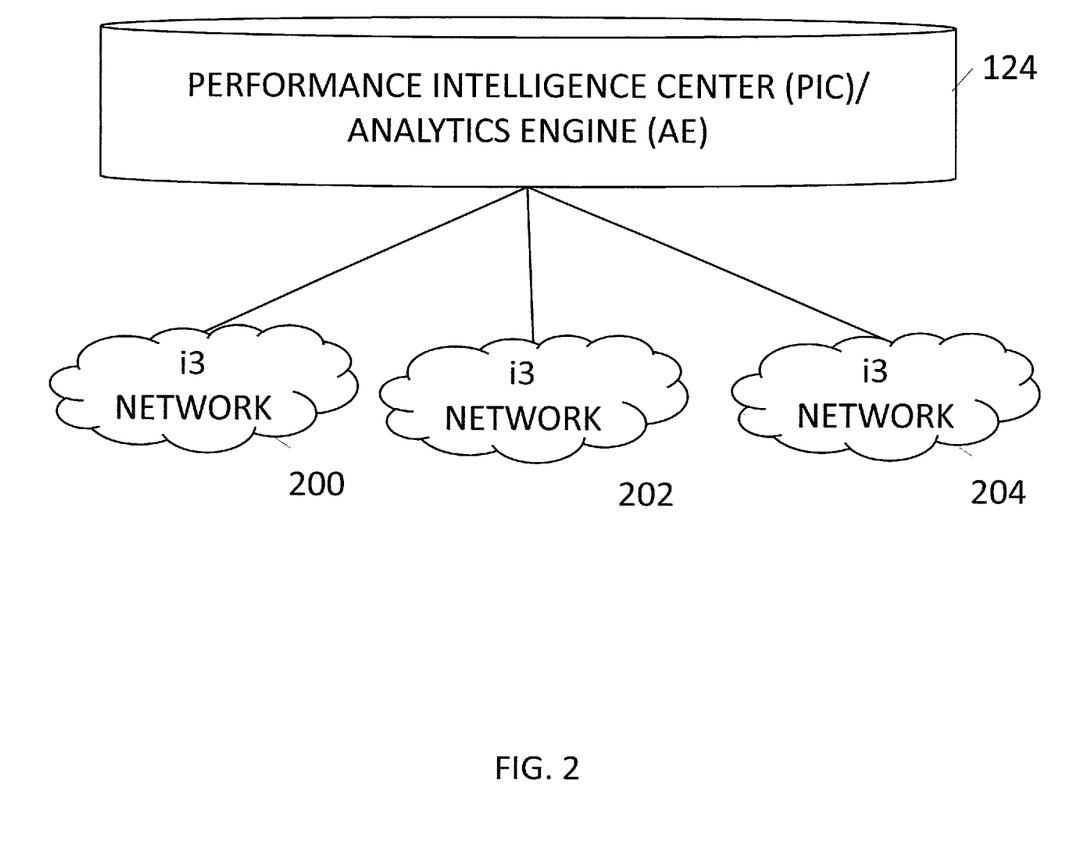
FIG. 2 is a diagram illustrating an exemplary performance intelligence center and/or analytics engine (PIC/AE) monitoring multiple networks according to an embodiment of the subject matter described herein.

FIG. 2 is a diagram illustrating PIC/AE 126 monitoring multiple networks according to an embodiment of the subject matter described herein. Referring to FIG. 2, PIC/AE 126 may be communicatively coupled to one or more nodes associated with i3 network 200, i3 network 202, and/or i3 network 204. Each of i3 network 200, i3 network 202, and i3 network 204 may be substantial similar to i3 network(s) 110. For example, each of i3 network 200, i3 network 202, and i3 network 204 may include ESRPs and PSAPs.

PIC/AE 126 may be configured to monitor and/or collect data about i3 network 200, i3 network 202, i3 network 204, and/or other networks or nodes. For example, PIC/AE 126 may receive status or state information about one or more components in operator network 100 or public safety network 102. Exemplary status or state information may include information about whether a node or network is congested, overloaded, offline, experiencing problems, or operating normally. Exemplary status or state information may also include statistics associated with a node or network, such as a current load, a projected load, historical load information, a number of active nodes performing a certain function, or a number of backup nodes available for use.

In some embodiments, data collection may be performed at various nodes (e.g., ESRPs, SBCs, or accounting nodes) separate from PIC/AE 126. For example, an ESRP from i3 network 200 may collect real-time or near real-time status information associated with various i3 (e.g., ESInet) network components. In this example, the ESRP may provide the collected information in one or more messages to PCRF 122 and PCRF 122 may provide the collected information to PIC/AE 126. In another example, an ESRP may provide collected information in one or more messages to PIC/AE 126 (e.g., without using PCRF 122). In some embodiments, collected data may be routed to PIC/AE 126 using DSR 120. For example, an ESRP may send state information collected from i3 network 200 via Diameter messages routed by DSR 120.

In some embodiments, a non-emergency network (e.g., operator network 100 or service provider network 104) may provide information about its network, nodes therein, and/or calls or messages traversing its network. For example, service provider network 104 may provide performance indicators and/or call or session detail records (xDRs) that include or indicate network status information and/or other relevant information.

In some embodiments, PIC/AE 126 may use monitored or collected data for analysis and event planning, e.g., so that a NG911 network (e.g., public safety network 102) or components therein may be aware of current conditions in associated networks (e.g., operator network 100). For example, PIC/AE 126 may perform analytics using collected information so as to provide real-time and/or post event analysis. In this example, an event may include a suspicious emergency call request and analysis may indicate one or more mitigation actions for preventing TDoS related to this emergency call request and/or similar (e.g., future) calls.

Using collected information and various analysis techniques, PIC/AE 126 may identify an origin of a call (e.g., an origination network and network type), an origination number classification (e.g., fixed line, wireless, VoIP, or unassigned), a service type (e.g., residence, business, multiple service types, or all one service type), a velocity or speed associated with an emergency call request (e.g., whether a call occurred within a specified period of call event, such as a natural disaster or other known emergency), state of service provider network 104 before and/or after an event (e.g., usable for understanding characteristics of attacks), state of all PSAPs within a region and/or country before and/or after an event, state of all ESRPs within a region and/or country before and/or after an event, information about anomalies before and/or after an event (e.g., such as calls from foreign or unknown networks).

Figure 3:
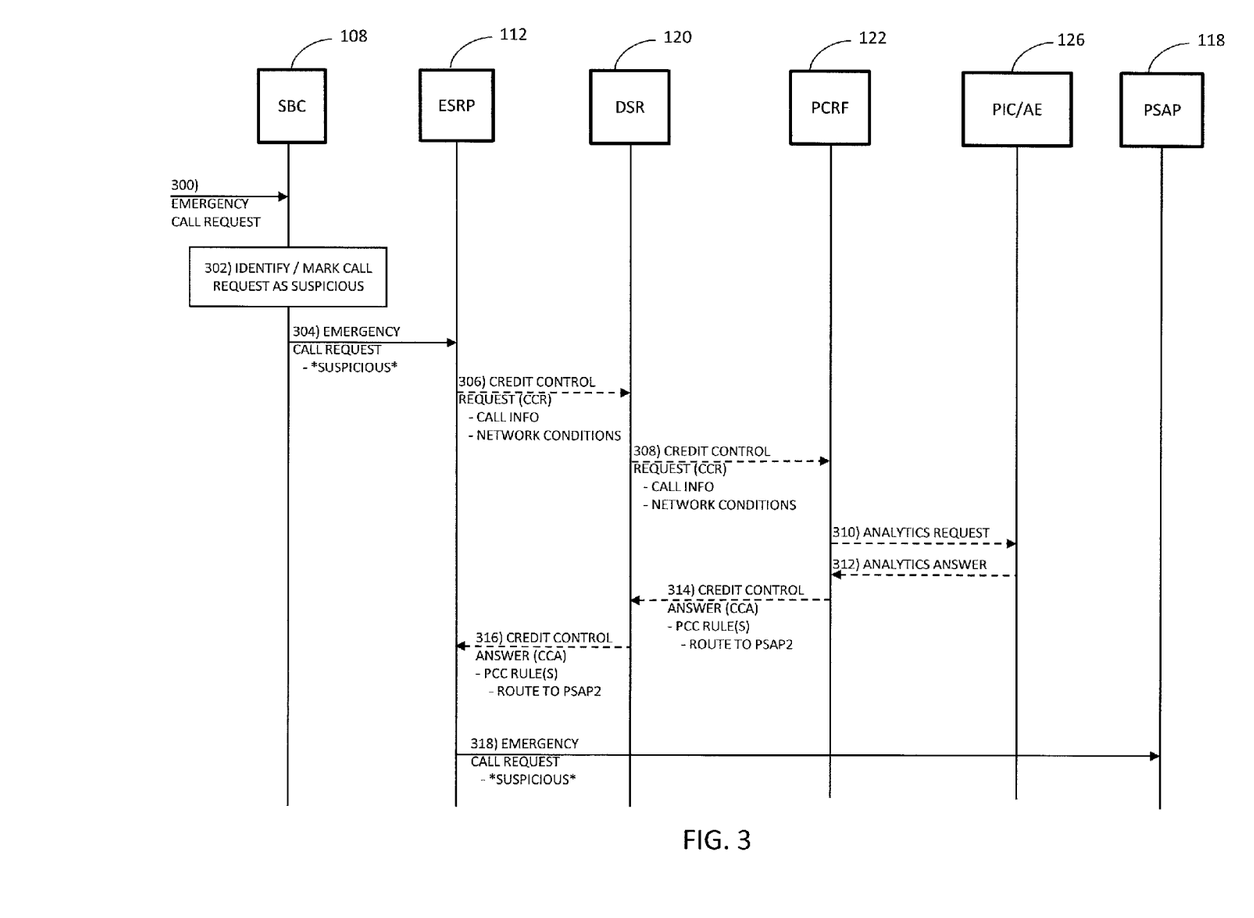
FIG. 3 is a diagram illustrating exemplary messages associated with determining policy information associated with an emergency call according to an embodiment of the subject matter described herein.

FIG. 3 is a diagram illustrating exemplary messages associated with determining policy information associated with an emergency call according to an embodiment of the subject matter described herein. Referring to FIG. 3, at step 300, an emergency call request (e.g., a SIP Invite message) may be received by SBC 108. The emergency call request may originate from a subscriber associated with service provider network 104 and/or operator network 100. The emergency call request may include information indicating an intended destination or usable to derive an intended destination.

SBC 108 may be configured to analyze an emergency call request and/or may determine whether an emergency call request or a related call is suspicious. Various factors may be used in determining whether an emergency call request or a related call is suspicious, such as destination information, time of day, day of week, historical information about previous emergency calls, source information, and/or related calls. For example, large volumes of calls to 9-1-1 for a specific location may be suspicious if received from multiple SIP provider networks. In another example, large volume of calls received not associated with a natural event (such as earthquake or flood) or other large-scale call event may be suspicious. In yet another example, calls that match some characteristics of previously identified suspicious calls may be suspicious.

At step 302, SBC 108 may be configured to identify, flag, or mark the emergency call request or a related call as suspicious. For example, SBC 108 may analyze a SIP Invite message associated with an emergency call and/or other related information and may determine that the emergency call request is suspicious (e.g., fraudulent or malicious). In this example, the SIP Invite message may be modified to include information (a parameter, a flag, or other indicator) for indicating that an emergency call request is suspicious. In another example, SBC 108 may identify an emergency call request as suspicious by sending a message separate from the emergency call request or by storing identifying information in storage device accessible by ESRPs 112 and 114 or other nodes. After identifying and/or marking the emergency call request as suspicious, SBC 108 may route or provide the emergency call request to a node (e.g., ESRP 112 or ESRP 114) associated with i3 network(s) 110.

At step 304, the suspicious emergency call request may be sent from SBC 108 to ESRP 112. ESRP 112 may be configured to request policy information (e.g., PCC rules) from PCRF 122. In some embodiments, ESRP 112 may send a Diameter message for requesting policy rules via DSR 120. In some embodiments, ESRP 112 may send a Diameter message or other message for requesting policy rules (e.g., without using DSR 120).

At step 306, a Credit-Control-Request (CCR) message may be generated and sent from ESRP 112 to DSR 120. The CCR message may be for requesting policy information and may include information associated with the suspicious emergency call request. For example, the CCR message may include destination information and source information associated with the emergency call request.

In some embodiments, ESRP 112 may include status or state information about i3 network(s) 110 in the CCR message. For example, ESRP 112 may include data collected about i3 network(s) 110 or nodes therein.

After receiving the CCR message, DSR 108 may analyze the CCR message to determine an appropriate destination for handling or processing the Diameter message. After determining the appropriate destination, the CCR message may be sent or routed from DSR 120 to the appropriate destination (e.g., PCRF 122).

In some embodiments, the CCR message may be sent to PCRF 122 without traversing DSR 120. In such embodiments, ESRP 112 may know or be able to obtain address information for reaching PCRF 122. ESRP 112 may generate or modify the CCR message such that the CCR message is addressed to PCRF 122.

At step 308, the CCR message may be sent from DSR 120 to PCRF 122. PCRF 122 may receive the CCR message and may determine one or more policy rules. When determining one or more policy rules, PCRF 122 may gather or obtain subscriber related information from various database and/or nodes.

In some embodiments, PCRF 122 may request information from PIC/AE 126. For example, PCRF 122 may request status information regarding a destination network, such as whether the destination network is currently experiencing problems or is congested and/or whether a call request or a related subscriber is associated with other suspicious calls.

In some embodiments, PCRF 122 may provide information to PIC/AE 126. For example, PCRF 122 may send status information about i3 network(s) 110 stored in a CCR message generated by ESRP 112.

At step 310, an analytics request message may be sent from PCRF 122 to PIC/AE 126. The analytics request message may be for requesting information associated with the related emergency call request or other analytics data, PIC/AE 126 may receive the analytics request message and may determine, using information in the analytics request message (e.g., a subscriber identifier and/or a destination identifier), appropriate information associated with the emergency call request or other analytics data.

At step 312, an analytics answer message may be sent from PIC/AE 126 to PCRF 122. The analytics answer message may be for providing information associated with the related emergency call request or other analytics data. For example, the analytics answer message may include status information associated with an intended destination network associated with the emergency call request.

PCRF 122 may receive the analytics answer message and use information in the analytics answer message in generating policy information. In some embodiments, policy information may include one or more URIs and/or instructions for sending a suspicious emergency call request to an investigative entity (e.g., a secondary PSAP 116) or may include instructions for altering a routing or handling priority associated with the emergency call request. For example, PCRF 122 may generate one or more policy rules for directing an emergency call request to a less congested PSAP 118 than a primary PSAP 116 associated with an intended destination and may include the one or more policy rules in a generated Credit-Control-Answer (CCA) message.

At step 314, a CCA message may be generated and sent from PCRF 122 to DSR 120. The CCA message may be for providing policy information and may include one or more PCC rules, such as rules for directing the suspicious emergency call request to PSAP 118.

After receiving the CCA message, DSR 108 may analyze the CCA message to determine an appropriate destination for handling or processing the Diameter message. After determining the appropriate destination, the CCA message may be sent or routed from DSR 120 to the appropriate destination (e.g., ESRP 112).

In some embodiments, the CCA message may be sent to ESRP 112 without traversing DSR 120. In such embodiments, PCRF 122 may know or be able to obtain address information for reaching ESRP 112. PCRF 122 may generate or modify the CCA message such that the CCA message is addressed to ESRP 112.

At step 316, the CCA message may be sent from DSR 120 to ESRP 112. ESRP 112 may receive the CCA message and download or install policy information contained in the CCA message. After installing the policy information, ESRP 112 may enforce the policy information. For example, if ESRP 112 received policy rules for directing a particular suspicious emergency call request to an investigative entity for further analysis, ESRP 112 may install the policy rules and may send the particular emergency call request to the investigative entity.

At step 318, the emergency call request may be sent from ESRP 112 to PSAP 118. For example, in response to receiving and enforcing policy rules associated with an emergency call request, ESRP 112 may route or send the emergency call request to PSAP 118 as directed by the policy rules.

PSAP 118 may receive the emergency call request and may respond such that a call or a session is established. For example, PSAP 118 may establish a SIP session by responding to a SIP Invite message with a SIP 200 OK message. Once a call or session is established, an originating subscriber may request one or more emergency services and PSAP 118 may attempt to provide the requested service(s).

It will also be appreciated that the above described messages are for illustrative purposes and that different and/or additional messages may be used.

Figure 4:
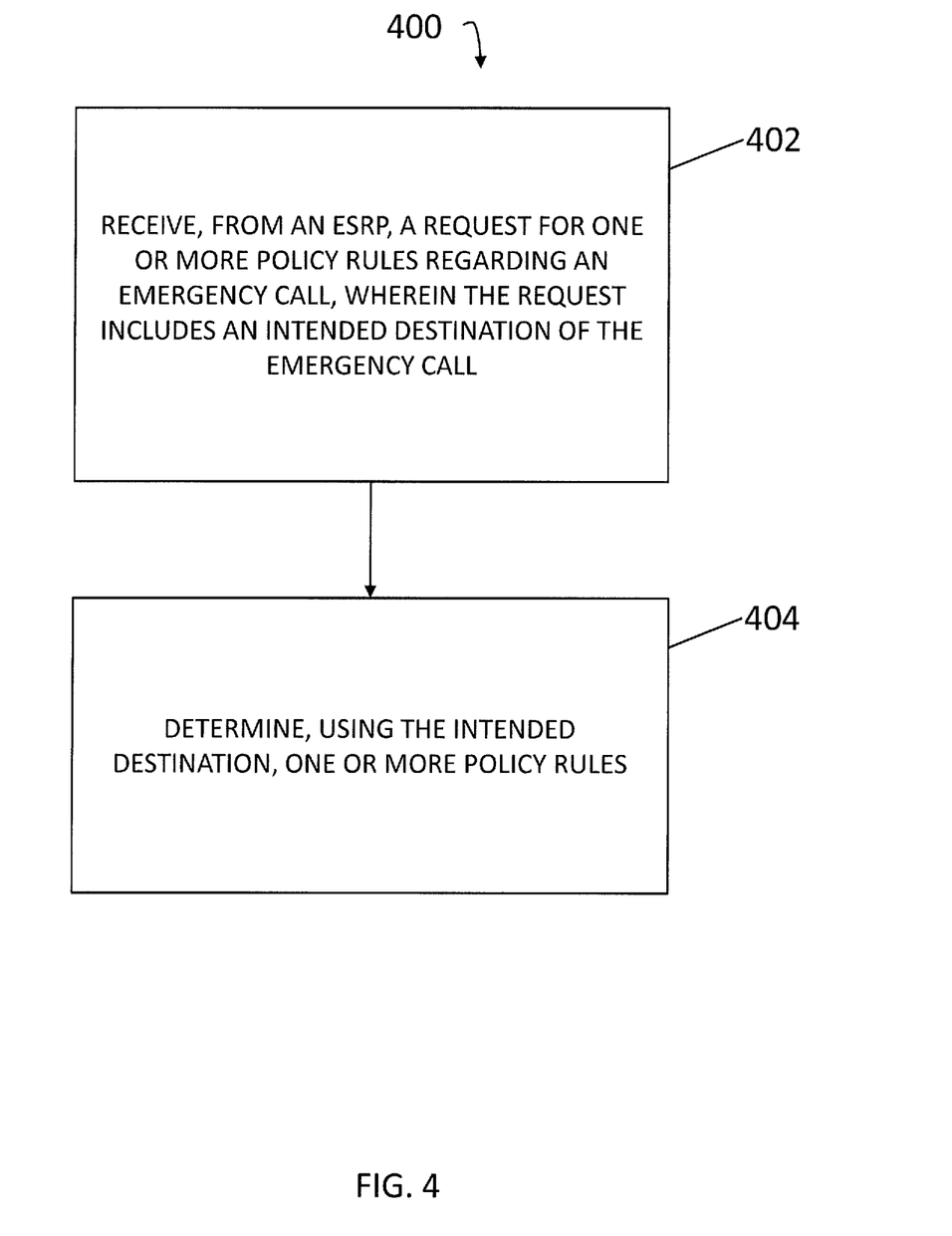
FIG. 4 is a diagram illustrating an exemplary process for determining policy information associated with an emergency call according to an embodiment of the subject matter described herein.

FIG. 4 is a diagram illustrating an exemplary process for determining policy information associated with an emergency call according to an embodiment of the subject matter described herein. In some embodiments, exemplary process 400, or portions thereof, may be performed by or at PCRF 122, ESRP 112, ESRP 114, DSR 120, and/or another node or module. For example, exemplary process 400 may be performed by PCRF 122 separate from ESRP 112 and ESRP 114. In some embodiments, exemplary process 400 may include steps 402 and/or 404.

At step 402, a request may be received from an ESRP (e.g., ESRP 112 and ESRP 114). The request may be for one or more policy rules regarding an emergency call. In some embodiments, the request may include an intended destination of the emergency call. For example, the request may be a Diameter message, such as a CCR message, and the CCR message may include information regarding an emergency call request (e.g., SIP Invite message) and/or other information (e.g., an indication from SBC 108 indicating suspicious characteristics associated with the emergency call request).

In some embodiments, a request for one or more policy rules may be sent in response to SBC 108 determining that an emergency call is suspicious.

In some embodiments, determining that an emergency call is suspicious may include determining that the emergency call is one of a large number of calls destined for a specific location, wherein the calls originate from multiple SIP provider networks. In some embodiments, determining that an emergency call is suspicious may include determining that the emergency call is one of a large number of calls not associated with a natural event or a known crisis. In some embodiments, determining that an emergency call is suspicious may include determining that the emergency call includes characteristics that match or are similar to other suspicious calls.

At step 404, one or more policy rules may be determined using the intended destination. For example, PCRF 122 may define rules based on the destination of a call or session, rather than an originator of the call or session. In this example, the rules defined may be based on whether the call is suspicious and/or a current state of the destination network or a related PSAP.

In some embodiments, one or more policy rules may be provided to ESRP 112, wherein ESRP 112 may enforce the one or more policy rules.

In some embodiments, one or more policy rules may be usable for preventing TDoS at a PSAP 116 or PSAP 118. For example, a policy rule may include information for directing that a suspicious emergency call request be discarded, reported to a policing entity, or further investigated, e.g., instead of being routed like a non-suspicious emergency call request.

In some embodiments, PCRF 122 may communicate with ESRP 112 or a monitoring system (e.g., PIC/AE 126) via DSR 120.

In some embodiments, a last ESRP 112 in a series of ESRPs associated with routing an emergency call request may communicate with PCRF 122, wherein other ESRPs in the series of ESRPs refrain from requesting policy rules from PCRF 122.

In some embodiments, one or more policy rules may indicate that the emergency call is to be handled differently than other emergency calls. In some embodiments, handling an emergency call differently than other emergency calls may include sending the emergency call to an alternate destination than the intended destination, modifying a priority of the emergency call, routing the emergency call to an investigative entity (e.g., ESRP 114), reporting the emergency call, or discarding the emergency call.

In some embodiments, determining, using an intended destination, one or more policy rules for an emergency call may include determining the one or more policy rules using the intended destination and information about a related network, such as whether a destination network is congested or is experiencing problems (e.g., delays or node failures).

In some embodiments, information about a related network (e.g., a network associated with an intended destination) may include state information received from the ESRP, a storage device, or a monitoring system.

In some embodiments, a monitoring system (e.g., PIC/AE 126) may be external to ESRP 112 and ESRP 114. The monitoring system may be configured to receive state and/or status information associated with one or more ESInet networks (e.g., i3 network(s) 110) from one or more ESInet components (e.g., nodes in i3network(s) 110).

In some embodiments, determining one or more policy rules using an intended destination for an emergency call and information about the intended destination or a related network may include determining that the related network is congested and generating the one or more policy rules such that the emergency call is given a lower priority than one or more other emergency calls (e.g., non-suspicious emergency calls) destined for the related network.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for determining policy information associated with an emergency call, the method comprising:
   at a policy and charging rules function (PCRF) separate from an emergency services routing proxy (ESRP), wherein the PCRF includes at least one processor and a memory:
   receiving, from the ESRP, a request for one or more policy rules regarding an emergency call, wherein the request includes an intended destination of the emergency call, wherein the request for one or more policy rules is sent in response to determining that the emergency call is suspicious; and
   determining, using the intended destination, one or more policy rules, wherein the one or more policy rules indicate that the emergency call is to be handled differently than a non-suspicious emergency call destined for the related network.

2. The method of claim 1 comprising providing the one or more policy rules to the ESRP, wherein the ESRP enforces the one or more policy rules.

3. The method of claim 1 wherein the one or more policy rules are usable for preventing telephony denial of service (TDOS) at a public-safety answer point (PSAP).

4. The method of claim 1 wherein the PCRF communicates with the ESRP or an analytics engine via a Diameter signaling router (DSR).

5. The method of claim 1 wherein the ESRP is a last ESRP in a series of ESRPs associated with routing the emergency call, wherein other ESRPs in the series of ESRPs refrain from requesting policy rules from the PCRF node.

6. The method of claim 1 wherein the request for one or more policy rules is sent in response to a session border controller (SBC) determining that the emergency call is suspicious.

7. The method of claim 6 wherein determining that the emergency call is suspicious includes determining that the emergency call is one of a large number of calls destined for a specific location, wherein the calls originate from multiple session initiation protocol (SIP) provider networks, determining that the emergency call is one of a large number of calls not associated with a natural event or a known crisis, or determining that the emergency call includes characteristics that match or are similar to other suspicious calls.

8. The method of claim 1 wherein handled differently than other emergency calls includes sending the emergency call to an alternate destination than the intended destination, modifying a priority of the emergency call, routing the emergency call to an investigative entity, reporting the emergency call, or discarding the emergency call.

9. The method of claim 1 wherein determining, using the intended destination, one or more policy rules includes determining the one or more policy rules using the intended destination and information about a related network.

10. The method of claim 9 wherein information about a related network includes state information received from the ESRP, a storage device, or an analytics engine.

11. The method of claim 10 wherein the analytics engine is external to the ESRP and is configured to receive state or status information associated with one or more emergency services Internet (ESInet) networks from one or more ESInet components.

12. The method of claim 9 wherein determining the one or more policy rules using the intended destination and information about the related network includes determining that the related network is congested and generating the one or more policy rules such that the emergency call is given a lower priority than one or more other emergency calls destined for the related network.

13. A system for determining policy information associated with an emergency call, the system comprising:
 a policy and charging rules function (PCRF) separate from an emergency services routing proxy (ESRP), the PCRF comprising:
 at least one processor; and
 a memory, wherein the PCRF is configured to receive, from the ESRP, a request for one or more policy rules regarding an emergency call, wherein the request includes an intended destination of the emergency call, wherein the request for one or more policy rules is sent in response to determining that the emergency call is suspicious and to determine, using the intended destination, one or more policy rules, wherein the one or more policy rules indicate that the emergency call is to be handled differently than a non-suspicious emergency call destined for the related network.

14. The system of claim 13 wherein the PCRF is configured to provide the one or more policy rules to the ESRP, wherein the ESRP enforces the one or more policy rules.

15. The system of claim 13 wherein the one or more policy rules are usable for preventing telephony denial of service (TDOS) at a public-safety answer point (PSAP).

16. The system of claim 13 wherein the PCRF communicates with the ESRP or an analytics engine via a Diameter signaling router (DSR).

17. The system of claim 13 wherein the ESRP is a last ESRP in a chain of ESRPs associated with routing the emergency call, wherein other ESRPs in the chain of ESRPs refrain from requesting policy rules.

18. The system of claim 13 wherein the ESRP is configured to send the request for one or more policy rules in response to a session border controller (SBC) determining that the emergency call is suspicious.

19. The system of claim 18 wherein the SBC is configured to determine that the emergency call is suspicious by determining that the emergency call is one of a large number of calls destined for a specific location, where in the number of calls originate from multiple session initiation protocol (SIP) provider networks, by determining that the emergency call is one of a large number of calls not associated with a natural event or a known crisis, or by determining that the emergency call includes characteristics that match or are similar to other suspicious calls.

20. The method of claim 13 wherein handled differently than other emergency calls includes sending the emergency call to an alternate destination than the intended destination, modifying a priority of the emergency call, routing the emergency call to an investigative entity, reporting the emergency call, or discarding the emergency call.

21. The system of claim 13 wherein the PCRF is configured to determine the one or more policy rules using the intended destination and information about a related network.

22. The method of claim 21 wherein information about a related network includes state information received from the ESRP, a storage device, or an analytics engine.

23. The method of claim 22 wherein the analytics engine is external to the ESRP and is configured to receive state or status information associated with one or more emergency services Internet (ESInet) networks from one or more ESInet components.

24. The method of claim 21 wherein the PCRF is configured to determine that the related network is congested and to generate the one or more policy rules such that the emergency call is given a lower priority than one or more other emergency calls destined for the related network.

25. A non-transitory computer readable medium comprising computer executable instructions embodied in the computer readable medium that when executed by a processor of a computer control the computer to perform steps comprising:
 at a policy and charging rules function (PCRF) separate from an emergency services routing proxy (ESRP):
 receiving, from the ESRP, a request for one or more policy rules regarding an emergency call, wherein the request includes an intended destination of the emergency call, wherein the request for one or more policy rules is sent in response to determining that the emergency call is suspicious; and
 determining, using the intended destination, one or more policy rules, wherein the one or more policy rules indicate that the emergency call is to be handled differently than a non-suspicious emergency call destined for the related network.

\* \* \* \* \*